United States Patent

[11] 3,540,479

| [72] | Inventor | Frank R. Thompson<br>68 Fordson Ave., Cranston, Rhode Island 02910 |
|---|---|---|
| [21] | Appl. No. | 711,011 |
| [22] | Filed | March 6, 1968 |
| [45] | Patented | Nov. 17, 1970 |

[54] HEAT MOTOR AND VALVE
46 Claims, 4 Drawing Figs.

[52] U.S. Cl. .................................................. 137/625.5,
251/11, 236/68, 60/23
[51] Int. Cl. ........................................... F16k 31/04
[50] Field of Search............................................ 251/11;
60/23; 236/68, 100, 34, 34.5; 251/128; 137/468

[56] References Cited
UNITED STATES PATENTS

| 2,833,507 | 5/1958 | Dube et al. ..................... | 251/11 |
| 3,016,691 | 1/1962 | Asakawa et al............... | 73/368.3X |
| 3,179,911 | 4/1965 | Schmitt......................... | 236/68X |
| 3,194,009 | 7/1965 | Baker............................. | 251/11X |
| 3,266,235 | 8/1966 | Carlson ......................... | 251/11X |
| 3,317,135 | 5/1967 | Feinberg ...................... | 251/11X |
| 3,319,467 | 5/1967 | Feinberg ...................... | 73/362.3 |
| 3,326,510 | 6/1967 | Kolze ............................ | 251/11 |

Primary Examiner—Arnold Rosenthal
Attorney—Lane, Aitken, Dunner & Ziems

ABSTRACT: A heat motor comprising an elongated metallic tube having a solid polytetrafluoroethylene rod therein as the heat expandable element and an electric heating coil wound about the tube in a nonlinear fashion to provide the heat for expanding the polytetrafluoroethylene rod. The heat motor is removably mounted on a valve body in position to unseat an internal valve element in response to expansion of the polytetrafluoroethylene.

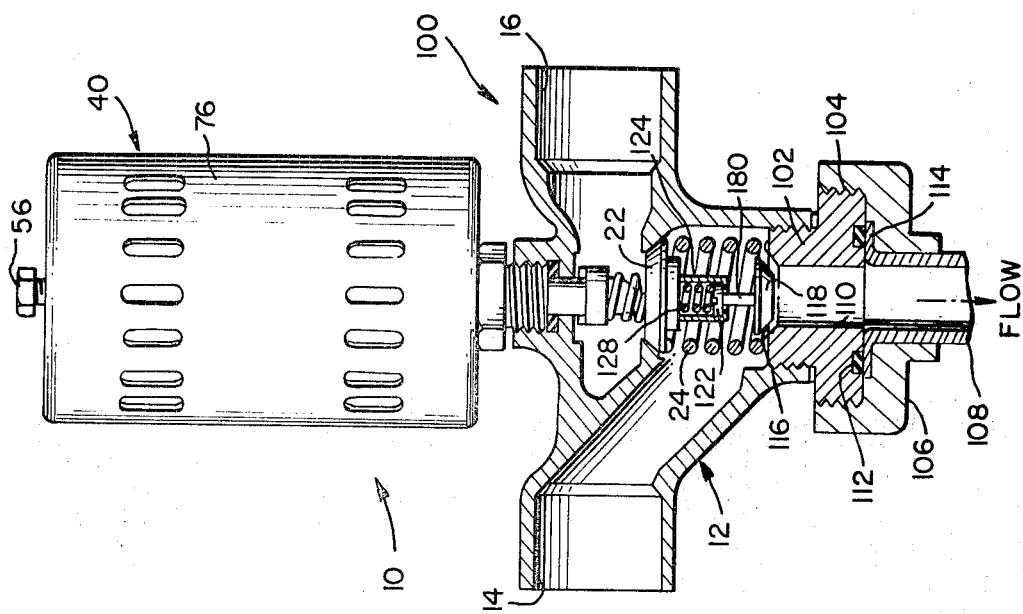
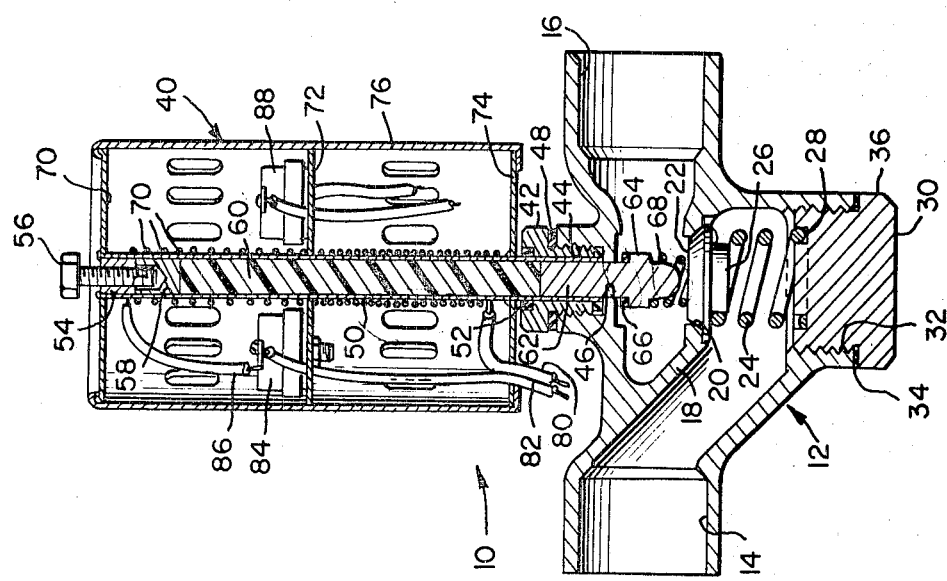

Patented Nov. 17, 1970
3,540,479
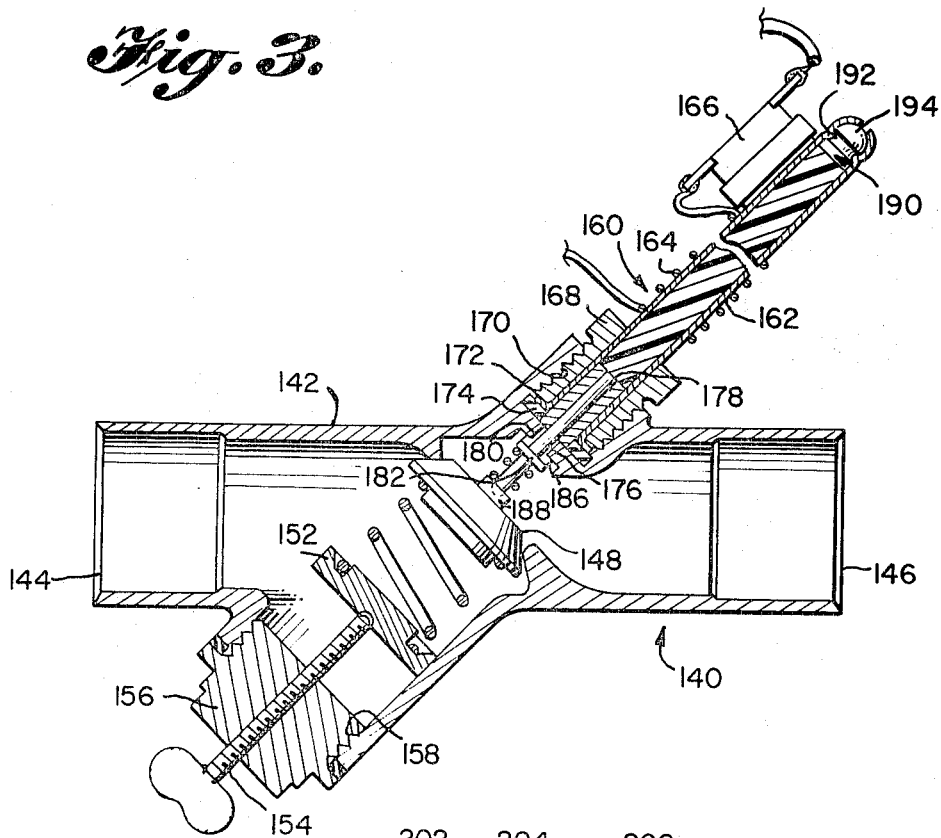
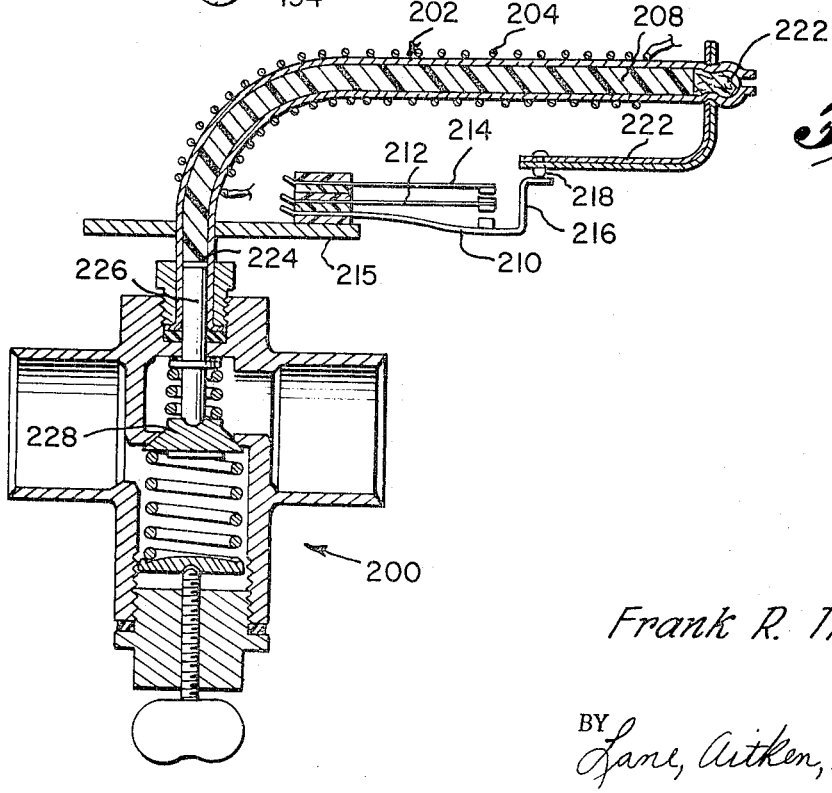
INVENTOR
Frank R. Thompson
BY
Lane, Aitken, Dunner + Ziems
ATTORNEYS

HEAT MOTOR AND VALVE

BACKGROUND OF THE INVENTION

The present invention relates to heat motors and heat motor actuated valves and more specifically to a heat motor having a heat expandable element of solid material which can be mounted on the valve in a manner to eliminate the need for a dynamic seal, such as a stuffing box, diaphragm, bellows, O-rings or the like. A well known prior art heat motor employs a Vernatherm element which contains a wax which changes into a liquid state when heated. The wax is sealed in the heat motor by a soft rubber diaphragm. When the wax changes to its liquid state it undergoes a large expansion which is transmitted through the rubber to an operating rod slidably mounted on the heat motor.

In remote controlled valves, such as zone valves used in hot water heating systems, the valve stem slidably projects through the valve body and a dynamic seal is provided to prevent water escaping past the valve stem. The Vernatherm element or other type of heat motor, is mounted on the valve in position to engage the projecting end of the valve stem to open and close the valve.

Heat motors are also known which employ elastomer and plastic materials as the heat expandable element. An example of such a heat motor is disclosed in the U.S. Pat. No. 3,317,135, to Feinberg, wherein a heat motor having a polyethylene heat expandable element is used for actuating a valve in the manner described above in connection with the Vernatherm element. The valve stem slidably projects through the housing and a plurality of O-rings are used to provide a sliding dynamic seal.

In the prior art heat motor actuated valves described above, the heat motor is spaced from the valve body to minimize the influence on the heat motor of the fluid passing through the valve. In hot water heating systems, for example, the temperature of the fluid can vary from 10°F. to 240°F. and this obviously can influence the operation of the heat motor. Also the movement of the valve stem is used in the prior art valves for producing a control signal to deenergize the heat motor at a predetermined position of the valve stem so the heat motor does not destroy itself. Despite this precaution, the heat motors do destroy themselves because the heat expandable material degrades with use and must be heated to a higher temperature to move the valve stem to the cutoff position.

SUMMARY OF THE INVENTION

In accordance with the present invention an improved heat motor and heat motor actuated valve is provided wherein the heat motor is mounted on the valve in a manner to eliminate the need for a dynamic valve stem seal. This is made possible by the use of a solid material as the heat expandable element which does not undergo a change of state in actuating the valve. The heat motor housing is mounted on and sealed directly to the valve body itself. The expansion of the heat expandable element is transmitted to the valve element through an opening in the valve body which is enclosed by the heat motor housing. The heat expandable element intimately engages an annular internal wall area of the housing to prevent fluid passing through the valve escaping through the opening.

A suitable heater is provided, such as an electric heating coil, for applying heat to the expandable element to expand it to actuate the valve element controlling the flow of fluid through the valve. A very important feature of the present invention resides in the use of a thermal responsive element for interrupting the heat applied to the heat expandable element at a predetermined maximum temperature to prevent the heat motor being heated to a temperature at which it might destroy itself.

With regard to the heat motor itself, many different types of solid elastomer and plastic heat expandable materials were tested and found to be satisfactory. Examples of some are silicone, EP and Viton rubber elastomer elements, and polyethylene and polypropylene plastic elements. However, of all the solid heat expandable materials tested, one material, polytetrafluoroethylene, proved to be outstandingly superior to all others.

Many of the characteristics of polytetrafluoroethylene are very advantageous for heat motors in general, and many are particularly advantageous for heat motor actuated valve applications wherein the intimate engagement between the polytetrafluoroethylene and the internal wall of the heat motor provides the seal for preventing fluid escaping from the valve. The latter characteristics are particularly advantageous in connection with valves, such as, for example, zone valves for hot water heating systems, wherein the fluid being controlled by the valve varies in temperature over a wide range.

Some of the characteristics of polytetrafluoroethylene are: It has little or no water absorption which often affects the characteristics of other elastomers and plastics by causing swelling of expansion material. It is not affected by the additives used to prevent freezing or rusting of water in hot water heating systems. It can be employed with valves for handling most chemicals providing the housing of the heat motor is compatible with the chemicals. It has the lowest coefficient of friction of any plastic or elastomer and retains this characteristic up to 500°F. or more. It needs no lubrication and retains this property indefinitely. Most elastomers tend to get gummy when exposed to high temperatures for an extended period of time and have a high coefficient of friction at all temperatures so as to require lubrication to reduce abrasion. The best lubricants require renewal and as temperatures increase, the life and effectiveness of the common lubricants decrease rapidly. Other elastomers and most plastics tend to get hard upon continued exposure to the high temperature. While this usually causes a reduction in friction, shrinkage generally occurs, and this cannot be tolerated in a volumetric expansion device.

Polytetrafluoroethylene fills the microscopic pores of the internal wall of the housing and covers the high spots. This reduces the oxidation of the internal wall, and therefore, the heat conductivity of the housing remains more constant, and the effects of corrosion are reduced. It is not affected by "copper poisoning" which is a highly desirable metal to be used for the heat motor housing. Hot water heating systems operate at temperatures ranging from 10°F. to 240°F. Heat expandable materials which have temperature limitations of 250°F. to 300°F. present serious "heat sink" problems. Polytetrafluoroethylene has a temperature limitation of about 500°F. and this provides significant advantages. Among other things it enables the heat motor to be designed to actuate a hot water zone valve at temperatures between 240°F. to 500°F. to minimize the influence on the heat motor of the hot water being handled by the valve.

All rubber compounds and most elastomers are effected to some degree by iron oxides which cause deterioration of the material. Polytetrafluoroethylene is not effected by these oxides encountered in heating systems. Nor is it affected by steam, and the affect of dry heat on polytetrafluoroethylene is less than on other elastomers or plastics. Polytetrafluoroethylene enables the heat motor to operate at higher temperature differentials to overcome what might otherwise be a low coefficient of expansion for many applications. It may be machined or even centerless ground to small diameters and relatively long lengths to tolerances of .001 inches or better. This makes it possible to take full advantage of most of its volumetric expansion.

Completely filling the heat motor housing chamber with the expandable material is very important if maximum utilization of the volumetric expansion is to be realized. By making the heat motor housing in the form of a tube, the polytetrafluoroethylene can be machined accurately to an OD slightly greater than the ID of the tube, and then stretched to a smaller diameter than the tube for easy insertion. Alternatively, the Teflon can be pushed through a die to reduce its OD. Upon application of heat slightly below the sintering temperatures, the polytetrafluoroethylene will "grow" until it completely fills all the voids in the tube. If unrestricted by the tube it will grow to the original machined dimensions within 8 to 10 percent. Processing temperatures may be selected during manufacture of the heat motors to insure the desired fit in the tube.

The vibration dampening properties of polytetrafluoroethylene throughout the sonic and ultrasonic region exceed most plastics and elastomers. When used for actuating valves, this property increases valve stability, reduces possibility of chatter, and in general allows valve operation at higher pressures and flows. Polytetrafluoroethylene is nontoxic and is approved by the Food and Drug Administration and all other government departments for use with food and drugs at temperatures up to 500°F. This significantly enhances the applicability of the polytetrafluoroethylene heat motor in the food, chemical and drug fields.

It is nonflammable and will not present a fire hazard in the event it is overheated and ruptures the heat motor housing. It is nonexplosive and any gases or vapors that may be generated can be vented harmlessly to the atmosphere. If the heat motor housing should rupture, the polytetrafluoroethylene will extrude from the rupture without a spectacular display. Heat motors employing a material which changes to a liquid state have to be designed so that rupture of the containers occur before the liquid changes to a gas otherwise the elements become a potential bullet.

Polytetrafluoroethylene's ability to sustain high temperatures for very long periods of time permits operation of heat motors and temperature differentials above ambient air and valve fluid temperatures encountered in most industrial, petroleum, gas, waterworks, sewage, heating and refrigeration applications. Higher temperature differentials between the heat motor and temperatures developed due to ambient or valve fluid temperatures permit more rapid cooling of the heat motor which improves valve response time and makes possible applications which would be impracticable with other materials utilizing volumetric expansion.

The objects and other features of novelty of the present invention will be specifically pointed out, or will otherwise become apparent when referring, for a better understanding of the invention, to the following description taken in conjunction with the accompanying drawings, wherein:

BRIEF DESCRIPTION OF THE DRAWINGS

FIG. 1 is a cross-sectional view of a two-way heat motor actuated valve illustrating one embodiment of the invention;

FIG. 2 is a cross-sectional view of a three-way heat motor actuated valve illustrating another embodiment of the invention;

FIG. 3 is a cross-sectional view of an angle valve illustrating another embodiment of the invention; and FIG. 4 is a cross-sectional view of another two-way valve illustrating another embodiment of the invention.

DESCRIPTION OF PREFERRED EMBODIMENTS

Referring to FIG. 1, a heat motor actuated valve 10 is illustrated which embodies features of the present invention. It comprises a valve body 12 having an inlet port 14 and an outlet port 16. The chamber within the valve is divided by an internal wall 18 having a valve seat 20 defining an opening through which fluid must flow in passing from the inlet port 14 to the outlet port 16. A valve element 22 is normally resiliently seated against the valve seat 20 by a coil spring 24 to interrupt flow between the inlet and outlet ports. If desired the inlet and outlet ports could be reversed.

The valve element end of the coil spring 24 is centered by a boss 26 projecting downwardly from the valve element 22. The other end of the coil spring is centered in an annular groove 28 in the face of a threaded plug 30 threadably mounted in and closing off a third port 32. An O-ring 34 is interposed between a flange 36 on the plug 30 to provide a seal therebetween. The third port 32 is large enough to enable the coil spring 24 and the valve element 22 to be removed and replaced.

A heat motor 40 embodying features of the invention is removably mounted on the valve body in coaxial alignment with the valve element 22. A nut 42 on the lower end of tube 50 threadably engages an internally-threaded counterbore 44 having an opening 46 in the bottom wall thereof overlying the valve element 22. An O-ring or gasket 48 is compressed between the lower end of the nut 42 and the bottom of the enlarged portion 44 to provide a stationary fluidtight seal therebetween.

The elongated tube 50 is made of a metal and in the preferred embodiment shown it is a stainless steel tube. The lower end of the tube 50 extends through the nut 42 with a tight fit, and is fixed and sealed to the nut by solder or weld metal 52 to prevent fluid escaping to atmosphere between the nut and the outer surface of the tube. The upper end of the tube 50 is closed by an internally threaded bushing 54 and a bolt 56 threadably extending through the bushing 54. The lower end of the bolt 56 is received in a counterbore in the upper surface of a bearing plug 58. The plug 58 bears against the upper end of the elongated, solid, heat expandable element 60 which may be made of any suitable solid heat expandable material, such as, the elastomers and plastics mentioned above but which in the preferred embodiment shown is made entirely of polytetrafluoroethylene.

The lower end of the heat expandable element 60 bears against the upper end of an operating rod or pin 62. The lower end of the operating rod is rounded for engagement with the valve element 22, as will be described, and a flange 64 is formed on the operating rod near the lower end thereof for supporting a seal 66 in position to seal off the opening 46 when the heat motor is removed, as will be described. A light duty spring 68 is interposed between the valve element 22 and the flange 64 for normally biasing the operating rod upwardly relative to the valve element 22. The upper end of the operating rod 62 slidably extends through the opening 46 into the lower end of the tube 50, the clearance between the upper end and the tube being large enough to ensure free sliding movement of the upper end of the operating rod at all times and small enough to prevent the heat expandable element 60 extruding into the clearance when heat is applied to the element 60, as will be described.

A similar clearance is provided between the bearing plug 58 and the internal wall of the tube 50 to prevent extrusion of the heat expandable element into this clearance while at the same time enabling the bearing plug 58 to be advanced downwardly by manually turning the bolt 56. The downward movement of the plug 58 physically slides the heat expandable element 60 downwardly to manually open the valve element 22 should this become necessary. any gasses which may collect at the upper end of the heat expandable element 60 are vented to atmosphere through the clearance between the bearing plug 58 and the tube, through radial passages (not shown) between the plug 58 and the bushing 54, and the clearance between the threads of the bolt 56 and bushing 54.

Three washer-shaped metal heat conducting fins 70, 72 and 74 are fixed to the tube 50, such as by welding or soldering, and a cylindrical thin walled metal housing 76 is supported on the fins 70—74. The fins and the housing are suitably slotted or apertured to facilitate circulation of air therethrough. An electric heating wire 78 is wound about the tube 50 with the insulation (not shown) therebetween being of good heat conductivity to ensure intimate heat contact between the wire and the tube. A number of different materials can be used for the wire, such as the standard nichrome resistance wire, but in the preferred embodiment illustrated a pure nickel wire is used because it has the characteristic of increasing its resistance with temperature which provides an advantage to be described. The heating wire 78 is wound in a nonlinear fashion with more turns per inch between the fins 74 and 72 than between the fins 72 and 70. This provides an additional advantage which will be described. However, it is to be understood that the term "nonlinear" as used in this specification and claims with respect to the heating wire is not limited to a winding having a varying number of turns per inch, but also may include a wire having a change in cross section or chemical composition in relation to its length.

Power is supplied to the ends of the heating wire 78 by lead wires 80 and 82, the lead wire 80 being connected to the lower end of the heating wire. A small thermostat 84 is mounted on the fin 72 with one terminal thereof connected to the lead 82 and the other terminal thereof connected to a lead wire 86 which is connected to the upper end of the heating wire. The thermostat 84 is a conventional commercially available type of thermostat which interrupts the electrical connection between the leads 82 and 86 to interrupt the electrical power to the heating wire when a predetermined maximum temperature is reached. In the preferred embodiment illustrated wherein the heat expandable element 60 is made of polytetrafluoroethylene, the thermostat 84 is selected to interrupt the power to the heating winding 78 when the element 60 reaches 500°F.

A second thermostat 88 may be mounted on the fin 72 and selected to provide an electrical signal at a predetermined temperature level below the 500°F. temperature sensed by the thermostat 84. This electrical signal can be used to control auxiliary equipment such as a heat circulating pump when the valve 10 is used as a zone valve in a hot water heating system. When properly designed, the temperature of the heat motor 40 accurately reflects the position or degree of opening of the valve element 22. Therefore, the thermostat 88 can provide a signal to start the circulator after the valve element 22 is unseated in accordance with the common practice in hot water heating systems.

In the position of the valve 10 as illustrated in FIG. 1, the valve element 22 is seated by the spring 24 and the operating rod 62 is in the position it normally assumes (spaced above the valve element 22) when the heating wire 78 is not energized to apply heat to the heat expandable element 60. If the valve 10 is used in a zone valve application for hot water heating systems wherein the hot water being controlled by the valve varies in temperature between 10°F. and 240°F., this temperature differential and ambient air changes influence the heat expandable element 60 and may vary the position of the operating rod 62 before the heating wire is energized. This space between the lower end of the operating rod 62 and the valve element 22 accommodates any movement of the operating due to such influences without unseating the valve element 22.

Should fluid being handled by the valve leak through the clearance between the tube and operating rod and contact the lower end of the heating element 60, the intimate engagement between the cylindrical surface of the heat expandable element and the internal wall of the tube 50 seals the fluid against leaking there between. This obviates the need for a dynamic seal such as a bellows, O-rings or a stuffing box. Since the fluid at most can contact the lower end of the expandable element 60, its influence on the temperature is minimized.

When the heating wire 78 is energized through the leads 80 and 82, the heat expandable element 60 volumetrically expands and forces the operating rod 62 downwardly until the rounded lower end thereof engages the valve element 22. The preferred embodiment illustrated is designed so that the expandable element 60 must be heated to above 240°F. before this point is reached. This makes the valve 10 particularly suitable for use as a zone valve in a hot water heating system. Continued application of heat unseats the valve element and moves it downwardly to fully open the valve element. In the event the thermostat 48 reaches the predetermined maximum temperature selected, the electrical power to the heating wire 78 is interrupted. When the temperature drops below the predetermined maximum, the thermostat 84 automatically reenergizes the heating wire. Thus the thermostat 84 provides the vital function of preventing the heat motor 40 from destroying itself by overheating. In the preferred embodiment the thermostat 84 is designed to interrupt the power to heating winding when the expandable element 60 reaches 500°F.

In the event it becomes necessary to manually open the valve element 22, this can be accomplished by rotating the bolt 56 to slide the heat expandable element 60 and the operating rod 62 downwardly to unseat the valve element 22. When the heat expandable element 60 is made of polytetrafluoroethylene, this mechanical or manual actuation is greatly facilitated because of the excellent low friction characteristics of polytetrafluoroethylene. The low friction characteristics of the element 60 also assist the spring 68 in returning the expandable element 60 to the position illustrated in FIG. 1 after the valve element 22 is seated. Prior to that, of course, the heavier duty spring 24 will provide the pressure for maintaining engagement between the operating rod 62 and the lower end of the heat expandable element 60 when the heat expanding element is undergoing a reduction in volume when the heating wire is deenergized.

In the event it becomes necessary to remove or replace the heat motor 40, a wrench can be applied to the nut 42 and everything but the operating rod 62 removed as a complete unit. Before the nut 42 is disengaged, the spring 68 will bias the seal 66 against the wall of the body surrounding the opening 46 to seal against fluid escaping from the valve after the heat motor 40 is completely removed. This enables the heat motor 40 to be removed without draining the system in which the valve 10 is connected.

In addition to providing a means for manually opening the valve, the bolt 56 can be used to adjust the response time of the valve, to compensate for ambient temperature effects and valve liquid temperature affects, and to adjust the stroke of the valve element 22. This follows from the fact that the position of the bolt 56 determines the space between the rounded end of the operating rod 62 and the valve element 22. This, in turn, changes the curve that would be produced by plotting the position of the valve element 22 at various temperatures of the heat motor for a given setting of bolt 56. Similarly, the response time of the heat motor can also be changed relative to the stroke of the valve element 22 by adjusting the bolt 56. If desired, suitable electric, hydraulic, pneumatic or mechanical devices could be employed for adjusting the position of the bolt by remote control. Varying the valve characteristics by remote control without requiring access to the valve itself would be advantageous where the valve is inaccessible or inconvenient to reach.

It is important to note that the volumetric expansion of the element 60 can increase the stroke of the operating rod 62 roughly three times greater than the stroke that could be obtained by relying solely on the linear expansion of the element 60. This is another reason why it is important to have the element 60 completely fill the tube 50 to avoid any clearance between the element 60 and the wall of the tube.

It is desirable to heat the tube 50 as uniformly as possible to attain the maximum volumetric expansion of the expandable element. Because the tube temperature at any point is directly influenced by (1) how it is mounted on the valve, (2) the ambient temperatures, (3) the line fluid temperatures, (4) the particular heat expandable material employed, (5) the diameter and length of the tube, (6) the heat conductivity characteristics of the tube, and (7) variations in line voltage, a method of compensation is necessary to ensure long life of the heat motor. To improve these characteristics and eliminate on off characteristics of the thermostats 84 and 88, the heating wire 78 is made of pure nickel rather than the standard nichrome because nickel has increasing resistance characteristics with temperature increases.

Further tests indicate that, if the heating wire 78 were wound linearly on the tube 50, three points on the tube could present problems. These are: (1) the juncture between the tube 50 and the valve body, (2) the juncture between the upper end of the operating rod 62 and the lower end of the heat expandable element 60, and (3) the juncture between the piston 58 and the upper end of the element 60. Point (1)

above acts as a heat sink when the tube temperatures exceed valve body temperatures. Conversely, when valve body temperatures exceed tube temperatures the valve body raises tube temperatures. Point (2) on the tube is critical because as tube temperatures increase, the possibilities of extrusion of the expandable element 60 around the operating rod 62 increase. Point (3) is less critical than point (2). Provision must be made for venting the tube as described, but the frequency of manual operation reduces the possibility of extrusion of the expandable element 60 at this point. Point (3) on the tube however, is directly affected by the mass of material required for manual operation, manufacturing tolerances, and adjustment or additional mechanisms which may be provided for attaining desired remote control characteristics.

The use of a heating wire 78 which has nonlinear characteristics with respect to the tube is therefore desirable. As previously mentioned the tube may be nonlinearly wound as illustrated in FIG. 1 to attain the nonlinear characteristics, or the cross section or chemical composition of the heating wire in relation to its length may be varied.

The number of heat conducting fins employed will depend on the length, diameter and material of the tube, the composition of the heat expandable element 60, the stroke, and the stroke versus temperature characteristics of the valve element 22. The fins may be slotted in a manner to permit winding of the continuous heating wire 78 about the tube by mechanical means. The area of the fins and their spacing may be combined with a linear or nonlinear winding to give the desired characteristics.

In the preferred embodiment illustrated, the tube 50 is 3½ inches long, and five-sixteenths inches in diameter. The lower fin 74 is positioned about five-eighths of an inch above the lower end of the tube, the upper fin 70 is positioned at the upper end of the tube and the middle fin 72 is positioned about halfway between the upper and lower fins. The diameter of each of the fins is 1¾ inches. The heat expandable solid element 60 is one quarter inch in diameter and 2½ inches long. All these dimensions are important for zone valve applications for which the valve 10 is designed and the operating characteristics of the valve 10 would drop off significantly if the diameter of the heat expandable element 60 were increased significantly or its length decreased significantly. In the valve 10 the spring 24 seats the valve element 22 with a force of about 40 pounds which is necessary to overcome the back pressure of the water in hot water heating systems.

It is also noted that the lower fin 74 is positioned above the juncture between the expandable element 60 and the operating rod 62, and that the lower end of the heating wire 78 is spaced above this juncture. The purpose of this is to reduce the temperature at this juncture to minimize the possibility of the expandable element 60 extruding into the clearance between the operating rod 62 and the tube 50.

The available voltage for energizing the heat motor may be such for some applications that it is impractical to wind a heating wire around the OD of the tube 50. In this case a different arrangement of fins and winding may be used so that heating wire diameters will not become too small to economically process, wind or manufacture the heat motors. Several alternative arrangements can be used. The three fins illustrated in FIG. 1 may be replaced by two or more fins, each extending radially from the tube from the upper end of the tube to a point spaced above the juncture between the heat expandable element 60 and the operating rod 62, with each of the fins defining a plane including the axis of the tube 50. The heating wire may then be wound over each of these fins from top to bottom thereof. In this manner the total length of the heating wire can be increased relative to the length of heating wire that could be wound directly about the tube itself. Also the temperature along the tube 50 can be equalized by making the upper edge of each of the fins longer than the lower edge of each of the fins and spacing the wire extending over each of the upper edges further apart as compared to the spacing of the wire extending over the lower edge of each of the fins.

As previously mentioned prior art heat motors were designed to deenergize themselves when the operating rod or piston of the heat motor, or the valve element or device actuated by the piston, reaches a predetermined position. However, expandable material has definite temperature limitations. When maximum temperature increases in the prior art heat motors, as it will, due to creep of the tube, wearing of the electrical contacts used to detect the position of the piston, deterioration of material, extrusion of the expandable material by the piston, or indirect influence caused by the valve seat itself, this leads to ultimate destruction of the heat motor.

The thermostatic control provided by the thermostat 84 effectively avoids this problem. The performance of the valve in terms of loss of stroke due to contact wear, creep, and so forth, cannot cause an increase in the maximum temperature applied to the tube which might destroy the heat motor. Any loss of stroke of the valve element can be tolerated by a valve design. However, progressively increasing maximum temperatures to the heat motor cannot be tolerated. As to loss of stroke, the globe valve design illustrated in FIG. 1 is best suited to compensate for any loss of stroke that may develop over long periods of time.

The on-and-off characteristics of thermostatic control may be undesirable for some heat motor applications, particularly where the application of heat to the tube followed by its removal occurs at frequencies in the neighborhood of 60 times per hour. This can reduce the life of all parts whose movements are a function of the temperature change. Thermostats are available which can control temperatures satisfactorily for such problem applications, but they are more expensive and may be ruled out for economic reasons. To overcome this problem, the thermostat 84 can be connected to the heating wire 78 to reduce rather than interrupt the current supply to the heating wire during periods of overheating and thus reduce the number of operating cycles of the thermostat 84.

One way of doing this is to divide the heating wire 78 into two windings wound on the tube. The circuit can then be designed so that both windings would be energized simultaneously, and so that one of the windings would be cut out automatically by the thermostat 84 when the predetermined maximum temperature selected is reached. The two windings could be of equal resistance or different resistance to attain the desired thermal characteristics.

A similar result can be obtained by connecting the contacts of the thermostat 84 in series with one end of the heating wire 78, as illustrated in FIG. 1, and adding an external resistance R in parallel with the contacts of the thermostat. When the thermostat contacts are closed during heating of the motor, the external resistance R is shunted out of the circuit and full current is supplied to the heating wire 78. However, when the maximum predetermined temperature is reached and the thermostat contacts open, the external resistor R is connected in series with the heating wire 78 so as to reduce the current supplied to the heating wire.

Since the polytetrafluoroethylene element 60 is not affected by contact with most known chemicals and their solutions, the remaining materials of the valve 10 can be selected to provide a heat motor actuated valve for applications heretofore impracticable. Special seat inserts of high nickel or chromium alloys marketed under the trade names Stellite and Hastelloy can be employed to make full use of the excellent chemical properties of polytetrafluoroethylene. This would also improve the performance of the valve 10 when it is used as a throttling or modulating valve rather than for an open and closed type of operation. The heat motor 40 is well suited for modulating applications. Also resilient valve seats can be employed to improve the performance of the valve 10 for vacuum or pressurized gas applications.

Referring to FIG. 2, a three-way valve 100 is shown which illustrates another embodiment of the invention. The valve body 12 and heat motor 40 are identical to those of FIG. 1 and, therefore, will not be described in detail. Only those parts which are different will be described and designated by new numbers.

The plug 30 of FIG. 1 is replaced by a plug 102 having an externally threaded portion 104 on the periphery of the flange thereof. The externally threaded portion 104 may be threadably engaged by a conventional union fitting 106 for connecting a conduit 108 to the plug 102 in alignment with a central passageway 110 through the plug 102. An annular seal 112 is mounted on the bottom face of the plug 102 in position to seal against a flange 114 on the upper end of the conduit 108.

A seat 116 is formed on the upper end of the passageway 110 and a secondary valve element 118 is movably mounted on the valve element 22 in position to engage the seat 110. Specifically, the secondary valve element 118 has a valve stem 120 threadably connected thereto with an enlarged head 122 on the upper end of the stem. A sleeve 124 is fixed to the underside of the valve element 22 and has an inwardly directed flange 126 formed on the lower end thereof to limit the downward movement of the head 122 relative to the valve element 22. A light duty spring 128 is positioned within the sleeve 124 for normally biasing the secondary valve element to the position illustrated in FIG. 2.

Thus when the heater winding 78 is energized to open the valve element 22 the secondary valve element will be advanced toward the seat 116. When it engages the seat it will interrupt fluid flow from the inlet port out through the passageway 110. At the same time the valve element 22 is open to enable fluid to flow from the inlet port 14 out through the outlet port 16. Conversely, when the valve element 22 and the secondary valve element 118 return to the position illustrated in FIG. 2, the outlet port 16 is closed and the passageway 110 is open. In the event the heat motor 40 continues to advance the valve element 22 downwardly after the secondary valve element 118 engages the seat 116, the slidable connection between the sleeve 124 and the head 122 of the secondary valve element provides the necessary relative movement between the valve element 22 and the secondary valve element 118 to accommodate any such overtravel of the valve element 22.

Referring to FIG. 3 an angle valve 140 is shown which illustrates another embodiment of the invention designed to reduce the vertical projection of the heat motor above the valve body. The valve 140 comprises a valve body 142 having coaxially aligned inlet and outlet ports 144 and 146. A valve element 148 is normally seated at an angle by a heavy duty spring 150 which bears against a block 152. The position of the block 152 can be adjusted by rotating the screw 154 threadably extending through a plug 156. The plug 156 is threadably mounted in a third port 158 in a manner to close the port.

The heat motor 160 comprises a metal tube 162 having a heating wire 164 wound thereabout and connected in series with the contacts of a thermostat 166 mounted on the free end of the tube, the thermostat deenergizing the heating wire at a predetermined maximum temperature, as previously described. A nut 168 is fixed on the lower end of the tube for threadably connecting the tube to an internally threaded counter bore 170 on the valve body. The valve end of the tube 162 has a flange 172 thereon which is pressed against a seal 174 by the nut 168. An operating rod or piston 176 is slidably mounted in a sleeve bearing 178 fixed in the lower end of the tube 162. The piston slidably projects through an opening 180 in the bottom of the counterbore 170. A flange 182, coil spring 184, and seal 186 are provided to automatically close off the opening 174 when the heat motor 160 is removed, as previously described in connection with FIG. 1.

The lower end of the piston 176 is rounded and engages a recess in a boss 188 on the valve element 148. This helps maintain the valve element and piston in alignment when the valve element is unseated by the heat motor, despite the angular disposition of the valve element.

The upper end of the tube 162 is sealed by a plug 190 having an annular groove 192 and a rounded end 194. The end of the tube is rolled into the annular groove and over the rounded end 194 to provide a good mechanical interlock between the tube and the plug 190. This may be reinforced by soldering or welding the plug 190 to the tube.

The heat expandable element 196 fills the tube 192 and extends between the operating rod 176 and the plug 190. In the preferred embodiment illustrated, the element 196 is 7 inches long and eleven/thirty-seconds inches in diameter. The tube 162 has an outside diameter of one half inch and a length of approximately 8¾ inches prior to the formation of the flange 172 and the rolled end portion engaging the plug 190. Manifestly, this heat motor construction will increase the stroke of the valve element 148.

Suitable air passages can be provided in the plug end of the heat motor 160 to vent gases, if necessary, but the valve 140 cannot be manually opened from this end of the heat motor as in the embodiment of FIG. 1. However, if the bolt 154 is backed off a sufficient distance to substantially unload the coil spring 150, the lighter duty coil spring 184 can unseat the valve element 148 a limited distance and thus provide for manual opening of the valve element. Also by turning the bolt 154 inwardly, the coil spring 150 can be highly loaded to forcefully close the valve element 148 and seal off the opening 180 should this become necessary.

In each of the heat motors illustrated in FIGS. 1—3, the elements 60 and 196 of polytetrafluoroethylene are inserted into the tube by a method which insures that they engage the internal wall of the tubes under pressure. This is done by machining and centerless grinding the element to an outside diameter slightly greater than the inside diameter of the tube. The ground element is then stretched until it retains an elongated shape with an OD slightly smaller than the ID of the tube when the stretching force is removed. In this condition it can be slipped into the tube without difficulty. The tube and element are then heated to a temperature just below the sintering point of polytetrafluoroethylene which causes the element to return to its prestretched size within 8 to 10 percent.

This produces the desired pressure engagement with the wall of the tube. Because polytetrafluoroethylene returns to within 8 to 10 percent of its prestretched size, and because it can be machined and ground to accurate dimensions, the heat motors can be designed to provide any desired pressure engagement between the element and wall from zero to a maximum desired pressure.

When the heat expandable element is made of an elastomer, such as, silicon, EP or Viton rubber elastomers, the heating step can be eliminated and the element slipped into the open ended tube while maintaining the stretching force. Once in the tube, the stretching force can be released to allow the element to expand radially into pressure engagement with the wall of the tube. The magnitude of the pressure engagement will be controlled by the ID of the tube and the OD of the element in its unstretched condition.

Referring to FIG. 4 a heat motor actuated valve 200 is shown which illustrates still another embodiment of the invention. It differs from the valve 140 illustrated in FIG. 3 primarily in that its heat motor 202 is bent or curved to reduce its vertical projection from the valve body. Curving the heat motor as illustrated makes it behave in a manner similar to a Bourdon tube. That is, as the heat motor is heated by the heating wire 204, the tube 206 and heat expandable element 208 will tend to straighten out and cause the free end of the tube to move upwardly. The amount of movement of the free end provides an accurate indication of the temperature of the heat motor and, therefore, can be utilized to deenergize the heating wire 204 at the predetermined maximum temperature and to control auxiliary equipment as previously described.

One arrangement for accomplishing this is shown in FIG. 4 wherein three contact blades 210, 212 and 214 are mounted on an operator base 216 which, in turn, is supported by the tube 206. The contact blade 212 has a pair of contacts on the end thereof one of which is engageable with a contact on the upper blade 214, and the other of which is engageable with a contact on the lower blade 210. An extension arm 216 is provided on the lower blade 210 which engages a suitable electric insulating element 218 mounted on the free end of an angle shaped member 220. The other end of the member 220 is fixed to the free end of the tube 206, and specifically the portion of the tube which is crimped about a porous metal plug 222.

When the heating wire 204 is not energized the member 220 normally biases the lower blade 210 downwardly so that the contact on the end thereof does not engage the contact on the middle blade 212 as shown in FIG. 4. When the heating wire 204 is energized and the heat motor is heated sufficiently to unseat the valve element, the design is such that the free end of the member 220 is raised sufficiently to allow the contact on the lower blade 210 to engage the middle blade 212 to close a circuit for controlling auxiliary equipment, such as the circulator of a hot water heating system. Continued heating of the heat motor 222 will open the valve element to its fully opened position. In the event the temperature of the heat motor should increase further above the predetermined maximum temperature previously mentioned in connection with FIG. 1, the member 220 will be raised far enough to allow the contact on the middle blade 212 to engage the contact on the upper blade 214, the contacts on the lower and middle blades remaining engaged. The closing of the contacts in the blades 212 and 214 energizes a relay (not shown) which, in turn, deenergizes the heating wire 204. If desired the member 220 can be a bimetal member as shown so as to be sensitive to the heat generated at the free end of the tube 206 to which the bimetal is connected. As the temperature at the end of the tubing increases the bimetal of the member 220 will curl the free end thereof having the insulator element 218 caused by the Bourdon tube movement of the free end of the tube 206.

In this embodiment the metal plug 222 is made of a porous metal to vent to atmosphere any gases that may be generated. It will also be observed that there is a small clearance at 224 between the lower end of the heat expandable element 208 and the upper end of the operating rod 226. This clearance performs a function analogous to that performed by the clearance between the lower end of the operating rod and the valve element 22 in the embodiment of FIG. 1. This clearance at 224 is desirable because there is no appreciable spacing between the operating rod or piston 226 and the valve element 228 in the valve 200 of FIG. 4.

In the embodiment illustrated in FIG. 4 the heat expandable element 208 is made entirely of polytetrafluoroethylene because the low friction characteristic of this material is particularly advantageous when the tube 206 is bent or curved as illustrated.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

I claim:

1. A heat motor actuated valve comprising a valve body having inlet and outlet ports communicating with a chamber in said valve body, a valve element in said chamber movable between first and second positions for controlling the flow of fluid between said ports, means for normally biasing said valve element to said first position, said valve body having an opening therein communicating with said valve element, heat motor means for sealing said opening against the escape of said fluid therethrough and moving said valve element to said second position, said heat motor means comprising housing means sealingly mounted on said body over said opening and a heat expandable solid element substantially filling at least a portion of said housing means, the interior of said housing means communicating with said opening, and motion transmitting means acting between said solid element and valve element for moving said valve element to said second position in response to the expansion of said solid element, said solid element being made of a material which is not adversely affected by said fluid and which remains in its solid state while expanding to move said valve element to said second position, whereby said heat motor seals against fluid escaping from said chamber through said opening.

2. The valve as defined in claim 1 including means for applying heat to said solid element.

3. The valve as defined in claim 2 wherein said heat applying means comprises an electric heating coil supported on said heat motor means.

4. The valve as defined in claim 2 wherein said solid element can be heated to about 500°F. repeatedly for extended time intervals without changing state and without significantly degrading the composition of said element.

5. The valve as defined in claim 4 wherein said solid element is made substantially entirely of polytetrafluoroethylene.

6. The valve as defined in claim 2 wherein said solid element is in the shape of an elongated rod having an axial length several times the maximum cross-sectional dimension of the rod.

7. The valve as defined in claim 6 wherein said rod is cylindrical with a diameter of about one fourth inch or less and a length of about 2½ inches or more.

8. The valve as defined in claim 6 wherein said solid element is made substantially entirely of polytetrafluoroethylene.

9. The valve as defined in claim 6 wherein said solid element intimately engages and annular area of the internal wall of said housing means along substantially the entire length of the solid element in both said first and second positions of said valve elements.

10. The valve as defined in claim 9 wherein the annular area of said housing means is defined by a metal tube which surrounds and resists transverse volumetric expansion of said solid element.

11. The valve as defined in claim 10 wherein said housing means includes heat conducting fins projecting from said metal tube.

12. The valve as defined in claim 2 wherein said motion transmitting means is arranged and constructed to enable said solid element to expand limited amount upon the application of heat thereto before moving the valve element from said first position.

13. The valve as defined in claim 12 wherein said solid element must be heated to above about 240°F. before motion is transmitted to said valve element.

14. The valve as defined in claim 13 wherein said solid element can be heated to 500°F. without changing state.

15. The valve as defined in claim 14 wherein said solid element is made substantially entirely of polytetrafluoroethylene.

16. The valve element as defined in claim 2 including temperature responsive means for interrupting said heat applying means when the temperature of said heat motor means reaches a predetermined maximum temperature.

17. The valve element as defined in claim 16 wherein said heat applying means includes an electric heating coil on said heat motor means, and said temperature responsive means comprises thermostat means associated with said heat motor means for interrupting the electrical power to said coil at said predetermined maximum temperature.

18. The valve element as defined in claim 3 wherein said coil forms a nonlinear winding on said housing means.

19. The valve as defined in claim 18 wherein there are no coil turns around the portion of the housing surrounding the end of said solid element adjacent to said valve element.

20. The valve as defined in claim 19 wherein said coil comprises a material which increases in resistance when the temperature of the material increases.

21. The valve as defined in claim 3 wherein said housing means includes an elongated portion filled by said solid element through a substantial part of the length of said elongated portion, and said coil is wound along the length of said solid element beginning at a point spaced from the end of said solid element adjacent to said valve element.

22. The valve as defined in claim 2 wherein said solid element is made of a low friction material.

23. The valve as defined in claim 22 including manually actuatable means acting on said solid element for sliding the solid element relative to said housing means to move said valve element to said second position.

24. The valve as defined in claim 1 including vent means on said housing means for venting gases that may be developed from heating said solid element.

25. The valve as defined in claim 1 wherein said motion transmitting means includes a member slidably mounted in said housing means in position to engage the portion of said solid element adjacent to said valve element, the clearance between said housing means and member being small enough to resist said solid element extruding past said member.

26. The valve as defined in claim 25 wherein said solid element is elongated and has a uniform cross section throughout its length, the portion of said housing means containing said member having a cross section identical to the cross section of said solid element.

27. The valve as defined in claim 26 wherein said solid means is made of a low friction material, and said heat motor means includes manually actuatable means engaging the end of said solid element furthest removed from said valve element for sliding the solid element relative to said housing means to move said valve element to said second position.

28. The valve as defined in claim 27 wherein said solid element is made entirely of polytetrafluoroethylene.

29. The valve as defined in claim 1 including means for automatically closing said opening upon removal of said heat motor means to prevent fluid escaping from said chamber through said opening.

30. The valve as defined in claim 29 wherein said motion transmitting means is disconnected from said valve element, and said automatic closing means is part of said motion transmitting means.

31. The valve as defined in claim 30 wherein said automatic closing means comprises a secondary valve element in said chamber between said valve element and opening, and means for resiliently biasing said secondary valve toward a closed position wherein said secondary valve element seals said opening, said secondary valve element being moved against said valve element by said heat motor means.

32. The vale as defined in claim 30 wherein said motor transmitting means includes a member having a rounded end portion for engaging said valve element in manner to compensate for misalignment.

33. The valve as defined in claim 8 wherein said housing means comprises an elongated metal tube surrounding said solid element.

34. The valve element as defined in claim 33 wherein substantially the entire length of said solid element intimately engages the internal wall of said tube under pressure when heat is applied thereto by said heat applying means.

35. The valve as defined in claim 33 wherein said heat motor means includes means for removably mounting the end of said metal tube on said valve body in a manner to provide an annular stationary seal about said opening.

36. The valve as defined in claim 34 wherein said tube is bent to reduce the distance it projects from the valve body.

37. The valve as defined in claim 36 including means for monitoring movement of the free end of the tube in response to the expansion of said solid element as heat is applied thereto and interrupting said heat applying means when said free end reaches a predetermined position.

38. The valve as defined in claim 37 wherein said monitoring means produces a control signal before said end reaches said predetermined position.

39. The valve as defined in claim 34 wherein said tube projects from said valve body at an acute angle relative to said valve body.

40. The valve as defined in claim 16 including second temperature responsive means for producing a control signal before the temperature of said heat motor means reaches said predetermined maximum temperature.

41. The valve as defined in claim 2 wherein said valve body has a third port communicating with said inlet port, and said valve element includes means for controlling the flow of fluid between said inlet port and third port in response to movement of the valve element between said first and second positions.

42. The valve as defined in claim 37 wherein said valve element comprises first and second valve closure portions interconnected for limited movement toward and away from one another, means for normally biasing said valve closure portions apart from one another, said second valve closure portion closing off said third port when said valve element is moved to said second position.

43. The valve as defined in claim 1 wherein said housing means completely closes off said opening so as to positively prevent said fluid escaping from the housing means.

44. The valve as defined in claim 1 wherein said solid element intimately engages an annular area on the internal wall of said housing means in both said first and second positions of said valve element to provide an annular seal against leakage of said fluid therepast.

45. The valve as defined in claim 44 wherein said motion transmitting means is arranged and constructed to enable said solid element to expand a limited amount upon the initial application of heat thereto before moving the valve element from said first position, and said solid element is in intimate engagement with said annular area during said initial application of heat as well as during movement of the valve element from said first to second position.

46. The valve as defined in claim 3 wherein said coil is made of pure nickel wire.